United States Patent [19]

Munakata et al.

[11] Patent Number: 4,767,211
[45] Date of Patent: Aug. 30, 1988

[54] APPARATUS FOR AND METHOD OF MEASURING BOUNDARY SURFACE

[75] Inventors: Chusuke Munakata, Tokyo; Shinobu Hase, Hachioji; Shigeharu Kimura, Kokubunji, all of Japan

[73] Assignee: Hitachi, Ltd., Tokyo, Japan

[21] Appl. No.: 88,538

[22] Filed: Aug. 20, 1987

Related U.S. Application Data

[63] Continuation of Ser. No. 785,533, Oct. 8, 1985, abandoned.

[30] Foreign Application Priority Data

Oct. 8, 1984 [JP] Japan ................. 59-209809

[51] Int. Cl.⁴ ............................................. G01B 11/00
[52] U.S. Cl. ................................. 356/375; 356/376; 356/446
[58] Field of Search ............... 356/375, 376, 372, 446, 356/448, 237; 250/560, 561, 562, 563, 571, 572

[56] References Cited

U.S. PATENT DOCUMENTS

| | | | |
|---|---|---|---|
| 3,229,564 | 1/1966 | Meltzer | 356/446 |
| 4,112,309 | 9/1978 | Nakazawa et al. | 250/560 |
| 4,202,627 | 5/1980 | Suzki et al. | 356/446 |
| 4,464,050 | 8/1984 | Kato et al. | 366/446 |
| 4,525,630 | 6/1985 | Chapman | 356/446 |
| 4,547,895 | 10/1985 | Mita et al. | 250/572 |

FOREIGN PATENT DOCUMENTS 847019  7/1981  U.S.S.R. ................. 356/372

*Primary Examiner*—F. L. Evans
*Attorney, Agent, or Firm*—Antonelli, Terry & Wands

[57] ABSTRACT

An apparatus for and a method of measuring a boundary surface of a sample are disclosed in which a ratio of the light quantity of a part of reflected light from a sample which travels in the vicinity of the optical axis of the reflected light, to the light quantity of another part of the reflected light which is directed to a position deviating from the optical axis by a predetermined distance is used to accurately measure a boundary surface of a sample. Since the accuracy of measurement is increased by using the above ratio, light capable of passing through the sample can be used as incident light. Thus, a deep hole in the surface of the sample and a void such as an air bubble in a living being sample, which cannot be measured by the prior art, can be measured very accurately.

17 Claims, 8 Drawing Sheets

APPARATUS FOR AND METHOD OF MEASURING BOUNDARY SURFACE

This application is a continuation of application Ser. No. 785,533, filed Oct. 8, 1985, now abandoned.

BACKGROUND OF THE INVENTION

The present invention relates to boundary surface measurement for detecting the shape of the wall of a deep hole or groove provided in the surface of, for example, a silicon wafer, and for detecting the shape of, for example, an air bubble or foreign particle contained in a cell of a living being.

As the integration density of a semiconductor device has been greatly increased in recent years, a semiconductor device is changing from a two-dimensional structure to a three-dimensional structure. Accordingly, in order to electrically insulating adjacent elements of the semiconductor device from each other, it has been put to practical use to provide a deep groove between adjacent elements. Further, in order to obtain a large electric capacitance in a small area, it has been tried to provide a deep hole having a small aperture in a semiconductor substrate. However, the characteristics of semiconductor elements are greatly affected by the shape of the groove or hole (hereinafter generically referred to as "hole"), and hence each semiconductor element is required to have a hole of the same shape. Accordingly, it is neccessary to check the shape of the hole, and hence means for measuring the shape of the hole is earnestly desired. However, it is impossible to find an apparatus capable of observing a deep hole provided in the surface of a silicon wafer. The term "deep hole" used herein indicates, for example, a hole having an aperture diameter of 1 $\mu$m and a depth of 10 $\mu$m (namely, a hole having a relative depth of 10 $\mu$m÷1 $\mu$m+10). According to a prior art, only a shallow hole provided in the surface of a body or the gentle unevenness of the above surface can be measured. For example, a shollow hole having an aperture diameter of 10 $\mu$m and a depth of 1 $\mu$m (namely, a hole having a relative depth of 1 $\mu$m÷10 $\mu$m=0.1) can be readily measured. Accordingly, a hole having an aperture diameter of 100 $\mu$m and a depth of 10 $\mu$m can also be measured. However, in a case where the cross section of a hole has a rectangular shape or circular shape, that is, the hole has a wall perpendicular to the surface or a circular wall, it is impossible to measure such a hole by the prior art.

A hole having an infinitesimal aperture can be thought as a special example of a deep hole. When the aperture diameter of a deep hole is made equal to zero, the deep hole becomes a void. Observation of voids will be frequently required in a process for fabricating a semiconductor device having a three-dimensional structure, and is also necessary for detecting and measuring the shape of an air bubble or foreign particle contained in a cell of a living being, in the field of biotechnology. However, the observation and measurement of a void in silicon cannot be made by any conventional apparatus, as a deep hole in the surface of silicon cannot be measured.

As mentioned above, the prior art cannot satisfy recent requirements with respect to surface measurement. Now, widely-used, conventional methods of measuring the surface of a body (that is, one mechanical method and three optical methods) will be explained below in detail, to clarify the drawbacks of the prior art.

Figure 3:
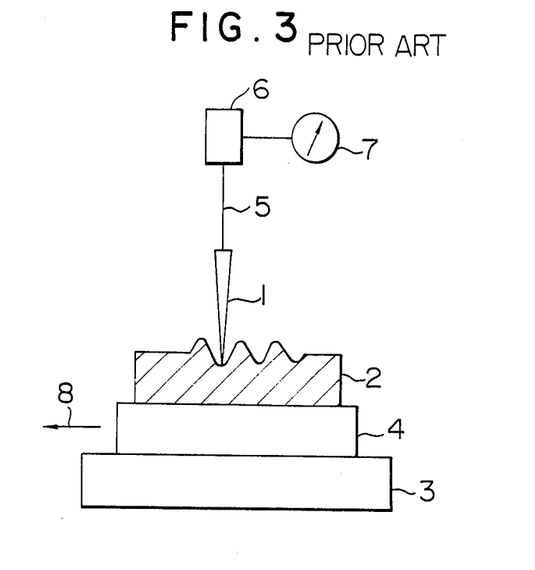
FIG. 3 is a diagram, partly sectional and partly schematic, of a conventional apparatus for mechanically measuring the unevenness of a surface.
Figure 4A:
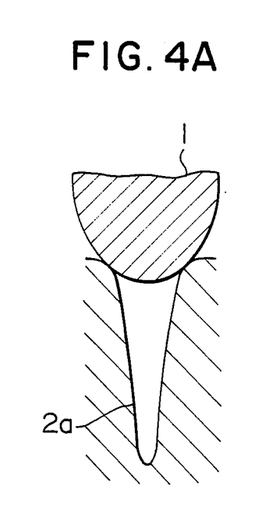
FIG. 4A is a sectional diagram showing a positional relation between the stylus of FIG. 3 and a deep hole provided in a surface.

FIG. 3 shows the fundamental construction of an apparatus for mechanically measuring the unevenness of a surface. Referring to FIG. 3, a stylus 1 is kept in contact with a body 2 which is to be measured, under a predetermined pressure, to measure the unevenness of the surface of the to-be-measured body 2 mounted on a sample holding table 4 which can move on a base stage 3. The stylus 1 is connected with a plunger 5 of a displacement detector (for example, a differential transformer) 6. When the stylus 1 rises and falls, the amount of displacement is indicated on a meter 7 through the detector 6. When the sample holding table 4 is moved in a direction indicated with an arrow 8, the to-be-measured body (hereinafter referred to as "sample") 2 moves together with the table 4, and hence the stylus 1 rises and falls in accordance with the surface state of the sample 2. A relation between the movement of the stylus 1 in a vertical relation and the movement of the sample 2 in a horizontal direction can be determined, and hence the unevenness of the surface concerned can be determined. Often the unevenness must be determined with accuracies as high as several nanometers. However, the tip of the stylus 1 has a radius of 1 $\mu$m or more, and hence the stylus 1, as shown in FIG. 4A, cannot be inserted in a deep hole 2a which is provided in the surface of the sample 2 and has an aperture diameter of 1 $\mu$m. That is, the shape and depth of the hole 2a cannot be measured by the stylus 1. Further, in the above-mentioned apparatus for mechanically measuring the unevenness of surface, the sample 2 is moved while being kept in contact with the stylus 1, and hence the sample surface may be damaged. The above mechanical measurement is a sort of destructive inspection, and has not been recommended in recent years.

Accordingly, attention has been paid to optical methods capable of performing non-destructive inspection. Of many optical means for observing and measuring the state of a surface (including the unevenness of a surface), an optical microscope is most widely used. Various optical microscopes have been known which are different in function from each other. Now, the measurement of surface unevenness made by reflection optical microscopes (a typical one of which is a metallurgical microscope) will be explained below, by way of example. In general, the optical microscopes are used for observing a fine structure on a flat surface, and cannot detect the exact structure of an uneven surface, since the unevenness of the surface often exceeds the focal depth of the optical microscope. Specifically, in a case where the magnification of an optical microscope is large, the vertical movement of a sample in a range from 1 to 10 $\mu$m will cause a large amount of defocus of an observed point on the sample. By utilizing this phenomenon, the unevenness of surface can be observed by the optical microscopes. In more detail, the objective lens of the optical microscope is moved in relation to a sample so as to visually detect that the focal point is placed on the surface of the sample, and the unevenness of the surface can be determined on the basis of the variation in position of focal point with the horizontal movement of the sample. However, it is impossible to obtain the reflected light from the bottom of a deep hole, and hence the deep hole is observed only as a black spot. Accordingly, the above-mentioned method is unapplicable to the measurement of a deep hole which is the subject of the present invention.

The above method can be used for measuring the depth of a shallow hole, since the reflected light from the bottom of the shallow hole can reach an optical microscope. In this case, however, the accuracy of depth measurement is not good for the following reason. The position of the focal point is judged on the basis of the contrast of the image observed visually by an operator. In an ordinary optical microscope, reflected light from a defocussed portion is also received by the operator's eyes through the optical microscope, and thus acts as the background light. The contrast of the image of an observed surface portion which is coincident with a focal plane, is lowered by the above background light, and hence it is difficult to determine the focal plane. That is, it is impossible to determine the focal plane with accuracies of 1 μm or less. Accordingly, the above method (that is, a first optical method) is inferior in accuracy of measurement to the mechanical method. The accuracy of measurement can be increased by making the field of view infinitesimal (that is, by placing a pinhole at the focal point of the eyepiece). In this case, however, the optical microscope does not function as the microscope, but becomes an optical, surface measuring apparatus which will be mentioned below.

Figure 5:
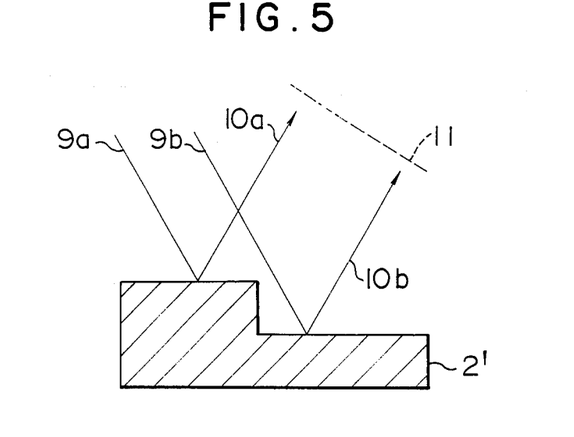
FIG. 5 is a sectional diagram showing the reflection of light from a surface having a step.

As mentioned above, a conventional deflection optical microscope can measure only the depth of a shallow hole with accuracies of several micrometers. The unevenness of a surface having a shallow hole can be very accurately measured by using the interference between light rays reflected from the surface. This method is the second optical method for measuring the surface of a sample, and is widely used for measuring the thickness of a film. Although the principle of this method is well known to the art, brief explanation thereof will be made, with reference to FIG. 5. Referring to FIG. 5, when coherent light rays 9a and 9b are incident on the surface of the sample 2', light rays 10a and 10 b are reflected from the surface. The phase of the light ray 10a is different from that of the light ray 10b by an amount corresponding to an optical path difference which results from the step at the surface. Thus, an interference pattern is formed on an appropriate plane 11. The step and the unevenness of the surface of the sample 2' can be quantitatively determined by analyzing the interference pattern.

Figure 4B:
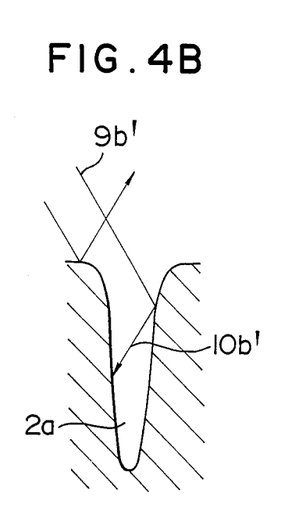
FIG. 4B is a sectional diagram showing a positional relation between light rays and the deep hole.

A main feature of this interference method is to measure the unevenness of a surface very accurately, and the unevenness in a range from 1 to 10 nanometers can be readily measured by this method. However, the interference method cannot be applied to a deep hole. Referring to FIG. 4B, when a light ray 9b' is incident on the wall of the deep hole 2a, a reflected light ray 10b' from the wall travels toward a bottom portion of the hole 2a, and hence cannot be observed at a place above the hole 2a. Thus, only an aperture diffraction pattern is observed. It is needless to say that the aperture diffraction pattern does not have information on the depth of the hole 2a but has only information on the aperture diameter of the hole 2a.

Figure 6A:
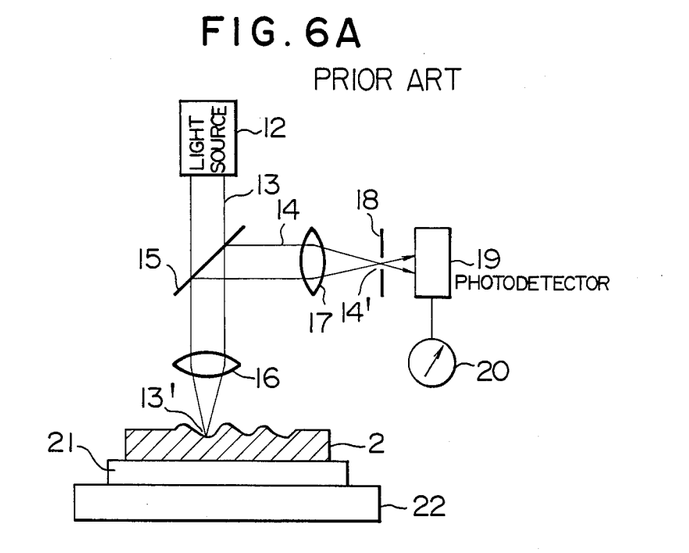
FIG. 6A is a diagram, partly sectional and partly schematic, of an optical, surface measuring apparatus.

The first and second optical methods are lowest and highest in accuracy of measurement, respectively. Next, explanation will be made of a third optical method having an intermediate accuracy of measurement. This method is described in an article entitled "Optical Profilometer for Monitoring Surface Contours of Si Power Devices" (SPIE, Vol. 398, 1983, pages 266 to 275). An apparatus for carrying out the third optical method will hereinafter be referred to as an optical, surface measuring apparatus. FIG. 6A shows the fundamental construction of this apparatus. Referring to FIG. 6A, a sample 2 is placed on a sample holding table 21 which can move not only in a horizontal direction but also in a vertical direction, and the table 21 is placed on a base stage 22. A light beam 13 emitted from a light source 12 passes through a half-mirror 15, and is then focussed by a lens 16 so that a focal point 13' is formed on the surface of the sample 2. An essential feature of the apparatus of FIG. 6A resides in that the light beam 13 has a relatively short wavelength. As a result, a large amount of reflected light is generated at the focal point 13'. The reflected light passes through the lens 16, and is then reflected from the half-mirror 15 so as to form a light beam 14. The light beam 14 is focussed on a focal point 14' by a lens 17, and thus a small light spot is formed at the focal point 14'. The light beam 14 which has been focussed as mentioned above, passes through a pinhole provided in a pinhole plate 18, and is then received by a photodetector 19. The quantity of light incident upon the photodetector 19 is indicated by a meter 20.

As is well known, the optical system shown in FIG. 6A is a confocal system, and hence the image of a point deviating from the focal point 13' is formed at a position deviating from the focal point 14'. When the surface of the sample 2 is spaced apart from the focal point 13' by moving the sample holding table 21 in the vertical direction, a large light spot is formed on the surface of the sample 2, and hence the light spot at the focal point 14' becomes large. Thus, the quantity of light capable of passing through the pinhole and reaching the photodetector 19 is decreased. Further, when the sample 2 is brought near to the lens 16, the light spot on the surface of the sample 2 becomes large, and hence the diameter of the light spot on the pinhole plate 18 is increased. As a result, the light quantity indicated by the meter 20 decreases.

Figure 6B:
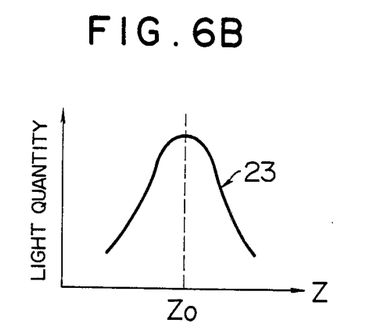
FIG. 6B is a graph showing the variation of light quantity with the vertical displacement of a sample.

The above fact can be shown by a curve 23 of FIG. 6B. In FIG. 6B, the position of the sample holding table 21 in the vertical direction is plotted as abscissa, and the light quantity received by the photodetector 19 as ordinate. Further, reference symbol $Z_o$ designates that position of the sample holding table 21 where the focal point 13' is placed on the surface of the sample 2. Referring to FIG. 6B, when the focal point 13' deviates from the surface of the sample 2 in an upward or downward direction, the light quantity received by the photodetector 19 decreases.

Figure 6C:
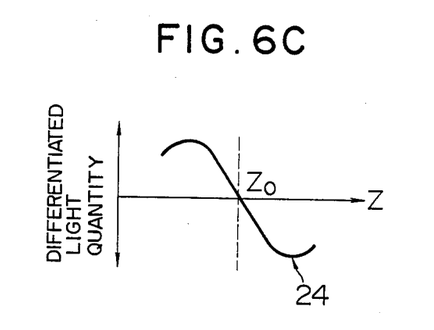
FIG. 6C is a graph showing the variation of differentiated light quantity with the vertical displacement of a sample.

As can be seen from FIG. 6B, the position $Z_o$ of the table 21 where the light quantity received by the photodetector 19 becomes maximum, can be determined by moving the table 21 which is mounted with the sample 2, in the vertical direction after the table 21 and the sample 2 have been displaced in the horizontal direction by a predetermined amount. In many cases, in order to accurately determine the position $Z_o$, a curve 24 shown in FIG. 6C is used in place of the curve 23. The curve 24 is obtained by differentiating the curve 23, and a position where the differentiated light quantity curve, namely, the curve 24 takes a value 0, indicates the position $Z_o$. The optical, surface measuring apparatus of FIG. 6A can measure the unevenness of a sample surface in the above-mentioned manner. Accuracy, with which the above apparatus can measure the unevenness of surface, is intermediate between the accuracy of the first optical method using an optical microscope and the accuracy of the second optical method utilizing the interference between reflected light rays. In many cases, accuracy of about 0.1 μm is obtained by the optical, surface measuring device of FIG. 6A. Moreover, this apparatus can measure the unevenness of surface in a non-destructive manner, and hence is superior in practicability to other conventional apparatuses.

Figure 4C:
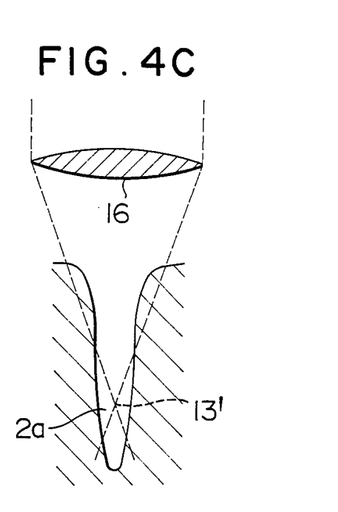
FIG. 4C is a sectional diagram showing a positional relation between a lens and the deep hole.

However, in order for the apparatus of FIG. 6A to have the above accuracy, it is required to make small the focal depth at the focal point 13'. Accordingly, the lens 16 is required to have a large aperture and a short focal length. As a result, the converging angle at the focal point 13' becomes large. Accordingly, when the apparatus of FIG. 6A is used for measuring the deep hole 2a, a surface area surrounding the deep hole 2a, as shown in FIG. 4C, prevents the focal point 13' from being formed in the hole 2a. In other words, the apparatus of FIG. 6A is unapplicable to the measurement of a deep hole.

Figure 7A:
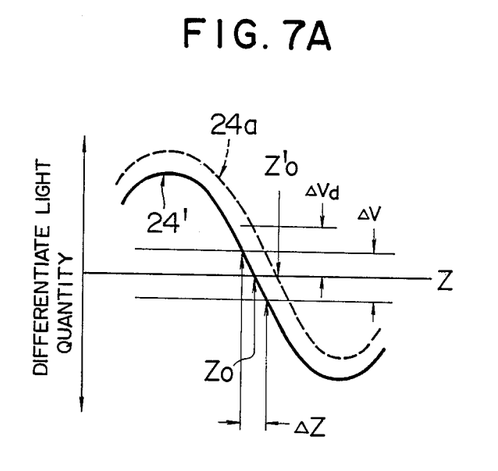
FIG. 7A is a graph showing a relation among the variation of differentiated light quantity with the vertical displacement of a sample, the "window" width of an amplifier, and the zero-drift of the amplifier.

Next, explanation will be made on the limit of the performance of the apparatus of FIG. 6A. In this apparatus, as shown in FIG. 6C, the position $Z_o$ where the focal point 13' is placed on the surface of the sample 2, is given by a position where the variation of received light quantity with the vertical displacement of the sample is zero. However, it is very difficult to detect a position where the differentiated value of received light quantity is exactly equal to zero, by using an electric circuit. Usually, a voltage signal within a range from $+\Delta V/2$ to $-\Delta V/2$ (or a current signal corresponding thereto) is detected for the position $Z_o$. The above recognition width $\Delta V$ is generally called a "window" width. Taking into consideration the noise level of a signal amplifier, the "window" width is set to a finite value. The "window" width will be explained below in more detail, with reference to FIG. 7A. In FIG. 7A, a differentiated light quantity curve 24' is the same as the curve 24 of FIG. 6C. It can be seen from FIG. 7A that owing to the "window" width, the position $Z_o$ is determined within a range $\Delta Z$. Not only the noise level of the signal amplifier but also the zero-drift thereof make the "window" width large. The zero-drift, that is, the variation of the zero level of the signal amplifier is caused by variations in room temperature and others. The noise and zero-drift of the signal amplifier are both unavoidable. Referring now to FIG. 7A, when a zero-drift voltage $\Delta Vd$ is generated, the differentiated light quantity curve 24' is moved to a broken curve 24a. Thus, the position $Z_o$ is seemingly moved to a point $Z_o'$. Thus, a gross error will be produced in determining the position $Z_o$. Accordingly, in the conventional method using differentiated light quantity, the accuracy $\Delta Z_o$ of measurement is as low as $\pm 0.1$ $\mu m$.

Figure 7B:
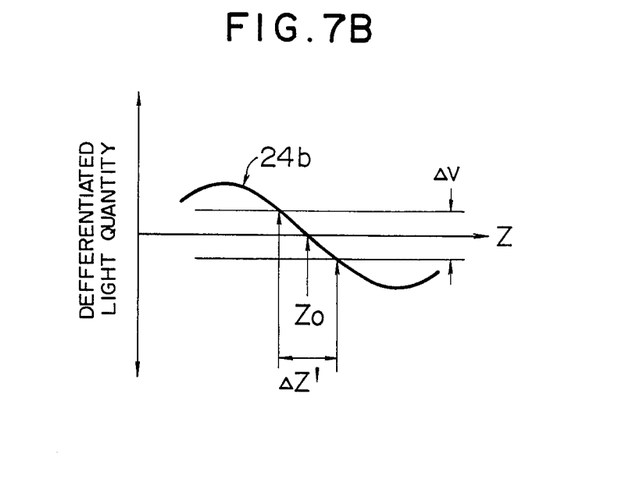
FIG. 7B is a graph showing the variation of differentiated light quantity with the vertical displacement of a sample in a case where only a small amount of light is reflected from the sample.

As can be seen from FIG. 7A, the accuracy $\Delta Z$ can be improved by making steep the slope of the curve 24'. This corresponds to an increase in the detected light quantity shown in FIG. 6B. However, the detected light quantity can be increased only in a limited range, and thus the accuracy $\Delta Z$, as mentioned above, is as low as $\pm 0.1$ $\mu m$. On the other hand, when the detected light quantity is decreased, a state such as shown in FIG. 7B occurs. Referring to FIG. 7B, the slope of a differentiated light quantity curve 24b is gentle, and thus the accuracy, with which the position $Z_o$ is determined, is changed from $\Delta Z$ to $\Delta Z'$ for the same "window" width, that is, is greatly reduced. The above reduction in accuracy due to a decrease in light quantity is a fatal drawback of the optical, surface measuring apparatus of FIG. 6A. In a case where the wavelength of the light beam 13 is such that the sample 2 transmits the light beam 13, the above drawback becomes remarkable.

That is, the reflected light from the sample 2 is greatly decreased, and hence the state of FIG. 7B occurs. Thus, the unevenness of surface cannot be measured from the practical point of view. Accordingly, it is impossible to measure a material which produces only a small amount of reflected light, by the optical, surface measuring apparatus of FIG. 6A.

As mentioned above, the conventional apparatus of FIG. 6A has three drawbacks mentioned below.

(1) The apparatus is unapplicable to a material generating only a small amount of reflected light (that is, a material capable of transmitting the light beam 13).

(2) The accuracy of measurement is dependent upon the detected light quantity.

(3) The "window" width in detecting a zero point cannot be made very small, because of variations in zero level of an electric circuit, and hence it is impossible to greatly improve the accuracy of measurement.

The fact that the apparatus of FIG. 6A is unapplicable to the measurement of deep hole, is related to the first one of the above drawbacks. Further, it is to be noted that the first, second and third drawbacks mentioned above are all caused by the fact that the position $Z_o$ is determined using differentiated light quantity.

SUMMARY OF THE INVENTION

An object of the present invention is to provide an apparatus for and a method of measuring a boundary surface, which makes it possible to measure the shape of a deep hole and the shape of a void contained within a body, both of which cannot be measured by the prior art.

Figure 8A:
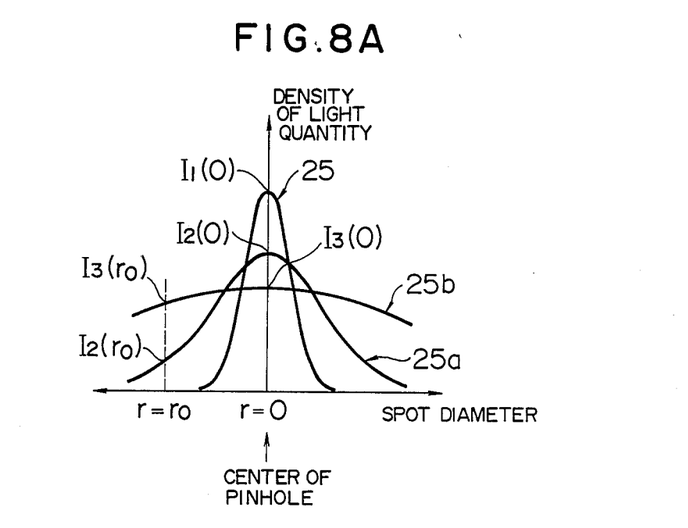
FIG. 8A is a graph showing the light intensity distribution in each of various light spots formed on a pinhole plate.

In view of the fact that the optical, surface measuring apparatus using the differentiated light quantity has the above-mentioned drawbacks, according to the present invention, a ratio between light quantities detected at two different positions is used in place of the differentiated light quantity. The principle of an inventive method using a ratio between two kinds of light quantities will be explained below, with reference to FIGS. 8A and 8B. FIG. 8A shows the light quantity distribution (in a radial direction) of a light spot formed on the pinhole plate 18 of FIG. 6A, for various positional relations between the sample 2 and focal point 13' of FIG. 6A. In FIG. 8A, a curve 25 shows a case where the focal point 13' is placed on the surface of the sample 2, so that a minimum light spot having a diameter of, for example, 1 $\mu m$ is formed on this surface, and thus the light spot at the focal point 14' becomes minimum. When the surface of the sample 2 is spaced apart from the focal point 13', the light quantity distribution at the focal point 14' is changed from the curve 25. As the distance between the focal point 13' and the surface of the sample 2 is larger, the diameter of the light spot formed on the pinhole plate 18 increases. That is, the light spot on the pinhole plate 18 has the light quantity distribution indicated by a curve 25a or 25b of FIG. 8A. When the sample 2 is brought near to the lens 16, the diameter of the light spot formed on the pinhole plate 18 increases in the same manner as mentioned above. It is to be noted that the curve 23 of FIG. 6B results from a change in spot diameter at the pinhole plate 18 such as shown in FIG. 8A. In more detail, in a case where the light spot at the focal point 14' is small as indicated by the curve 25 in FIG. 8A, almost the whole portion of the light beam 14 passes through the pinhole of the plate 18, and therefore the curve 23 of FIG. 6B takes a maximum value. Then the distance between the sample 2 and the lens 16 is changed, the diameter of the light spot formed on the pinhole plate 18 increases in the order of the curves 25, 25a and 25b. Thus, the light quantity passing through the pinhole of the plate 18 is decreased.

When the area of the pinhole provided in the pinhole plate 18 and the density of light quantity on the optical axis of the light beam 14 are expressed by $S_o$ and $I(0)$, respectively, a light quantity $I_{pin}$ passing through the pinhole of the plate 18 is given by the following equation:

$$I_{pin} = I(0)S_o \quad (1)$$

In the prior art, only the light quantity $I_{pin}$ is detected, and differentiation processing is made for this light quantity. Incidentally, the curve 23 of FIG. 6B is an $I_{pin}$ - curve. According to the present invention, the light quantity at a position deviating from the above optical axis is measured, in addition to the light quantity $I_{pin}$. Referring to FIG. 8A, when an aperture having an area $S_r$ is provided at a position which deviates from the optical axis by a distance $r_o$, and the density of light quantity at this position is expressed by $I(r_o)$, a light quantity $I_r$ at the position ($r = r_o$) is given by the following equation:

$$I_r = I(r_o)S_r \quad (2)$$

Now, consider the variation of the two light quantities $I_{pin}$ and $I_r$ given by the equations (1) and (2) with the vertical movement of the surface of the sample 2. As indicated by the curve 23 of FIG. 6B, the light quantity $I_{pin}$ varies only a little in the vicinity of the position $Z_o$ where the focal point 13' is placed just on the surface of the sample 2. Accordingly, it is impossible to accurately determine the position $Z_o$ from the curve 23. In the prior art, the differentiation processing is performed for the curve 23, to convert the curve 23 into the curve 24 which has a steep slope at the position $Z_o$.

The $I_{pin}$ - curve (namely, the curve 23) has a very gentle slope in the vicinity of the position $Z_o$ for the reason that almost the whole portion of the light beam 14 can pass through the pinhole of the plate 18 when the surface of the sample 2 is located in close proximity to the focal point 13'. On the other hand, as can be readily seen from FIG. 8A, the light quantity $I_r$ at the position ($r = r_o$) is smaller as compared with the light quantity $I_{pin}$, but varies greatly (that is, varies from zero to a finite value) with the vertical displacement of the sample 2. Now, let us consider a case where the area $S_r$ is far greater than the area $S_o$, by way of example. From the equations (1) and (2), we can obtained the following equation:

$$\frac{I_r}{I_{pin}} = \frac{I(r_o)}{I(0)} \cdot \frac{S_r}{S_o} \quad (3)$$

For the curve 25b of FIG. 8A, the density of light quantity $I(0)$ is nearly equal to the density of light quantity $I(r_o)$, and hence the equation (3) can be rewritten as follows:

$$\frac{I_r}{I_{pin}} \approx \frac{S_r}{S_o} \gg 1. \text{ That is } I_r \gg I_{pin} \quad (4)$$

Further, it is known from FIG. 8A that, for the curve 25a, the following formula is obtained.

$$I_r = I_{pin} \quad (5)$$

Furthermore, for the curve 25 of FIG. 8A (that is, in a case where the focal point 13' is placed just on the surface of the sample 2), the following formula is obtained:

$$I_r < I_{pin} \quad (6)$$

In this case, if the light beam 14 is focussed on the point 14' in an ideal manner, the light quantity $I_r$ will approach infinitely to zero, that is, the following formula will be obtained:

$$I_r \rightarrow 0 \quad (7)$$

For example, the distance between the optical axis of the light beam 14 and a position where the density of light quantity equal to $1/e$ (where e is the base of natural logarithm) of the density of light quantity $I(0)$ on the optical axis, is used as the distance $r_o$.

Figure 8B:
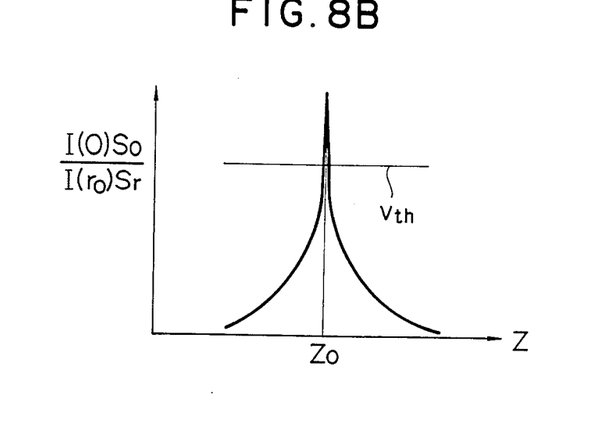
FIG. 8B is a graph showing the variation of a ratio between two kinds of light quantities with the vertical displacement of a sample.

As can be seen from the above explanation, the light quantity $I_r$ at the position ($r = r_o$) is more suited for determining the position $Z_o$, as compared with the light quantity $I_{pin}$ passing through the pinhole. Incidentally, the position of the table 21 corresponding to $I_r = 0$ is the position $Z_o$ shown in FIGS. 6B, 6C, 7A and 7B. However, the use of only the light quantity $I_r$ is not always favorable for two reasons mentioned below. The first reason is that the detection of the position $Z_o$ using the light quantity $I_r$ is disturbed by variations in zero level of an electric circuit, that is, encounters with the same difficulty as in the detection of zero value of the differentiated light quantity according to the prior art. In more detail, when the zero level of the circuit exceeds a zero-point detecting window on the basis of the zero-drift of the circuit, the position $Z_o$ becomes indefinite, and thus a system for measuring a boundary surface runs away. The second reason is that the detection level of the light quantity $I_r$ varies with the quantity of light reflected from the sample 2. Accordingly, in the present invention, a ratio $I_{pin}/I_r$ is used for detecting the position $Z_o$. By using this ratio, the previously-mentioned three drawbacks of the prior art can be eliminated. As suggested by the formulae (3) to (6), the ratio $I_{pin}/I_r$ varies with the vertical displacement of the sample holding plate 21 (that is, the vertical displacement of the sample 2) in a manner shown in FIG. 8B. As is apparent from the comparison of FIG. 6C with FIG. 8B, the differentiated light quantity curve 24 becomes zero at $Z = Z_o$, and a $I_{pin}/I_r$ ratio curve of FIG. 8B becomes infinite at $Z = Z_o$. Accordingly, even if a little drift is generated in the electric circuit, the detection of the position $Z_o$ is not affected by such drift. The $I_{pin}/I_r$ ratio curve may be differentiated, to measure a boundary surface. In the present explanation, however, a threshold value $V_{th}$ is set for the $I_{pin}/I_r$ ratio curve as shown in FIG. 8B, and a position where this ratio curve exceeds the threshold value $V_{th}$ is used as the position $Z_o$.

As mentioned above, according to the present invention, the adverse effect of the zero-drift of an electric circuit on the accuracy of measurement, which is the third drawback of the prior art, can be utterly neglected. Further, the light quantity dependence of the accuracy of measurement, which is the second drawback of the prior art, can be completely eliminated. That is, when the quantity of light reflected from the sample 2 is decreased, the light quantity $I_{pin}$ in the equation (1) and the light quantity $I_r$ in the equation (2) are decreased at the same rate. Accordingly, the ratio $I_{pin}/I_r$ is independent of the quantity of light reflected from the sample 2, and depends upon only the positional relation between the sample 2 and the focal point 13'. The first drawback of the prior art is closely connected with the second drawback thereof. According to the present invention, the accuracy of measurement, as mentioned above, is independent of the quantity of light reflected from the sample 2, and therefore the first drawback of the prior art can be overcome. In more detail, according to the present invention, the position $Z_o$ can be detected even when only a small amount of light is reflected from the sample 2. Accordingly, the present invention is applicable to a material which transmits the light beam 13.

As can be seen from the above, the characteristic feature of the present invention resides in that, in addition to the measurement of the light quantity $I_{pin}$ which is used in the prior art, the light quantity $I_r$ at a position which is spaced apart from the focal point 14' of FIG. 6A in a radial direction, is measured. However, it is not always easy to measure both the light quantity $I_{pin}$ and the light quantity $I_r$. In a case where the light quantity at a small area having a diameter of, for example, 1 μm is used as the light quantity $I(0)$, the distance $r_o$ between the focal point 14' and the position where the light quantity $I_r$ is to be measured, is made equal to, for example, 5 μm. In such a case, it is impossible to measure the light quantity $I_{pin}$ the light quantity $I_r$ by simply juxtaposing two ordinary photodetectors. Further, a discrete photodetector having a dimension of 1 μm is not yet available on the market. In view of the above fact, two kinds of light detection systems are herein proposed. The first system uses beam splitting means, and the second system uses a semiconductor photodetector.

Figure 9:
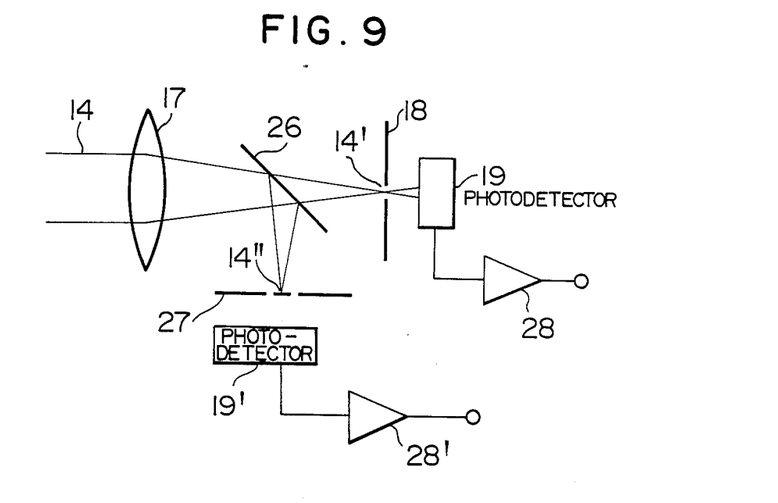
FIG. 9 is a schematic diagram showing part of a boundary surface measuring apparatus, in which central and peripheral portions of a reflected light beam from a sample are measured independently by two photodetectors.

The first light detection system is shown in FIG. 9. In more detail, FIG. 9 shows a case where the first system is applied to the optical, surface measuring apparatus of FIG. 6A. Referring to FIG. 9, the pinhole plate 18 is used for detecting the quantity $I_{pin}$ of light travelling in the vicinity of the optical axis of the light beam 14. A pinhole having a diameter of, for example, 1 μm is provided in the plate 18, and the focal point 14' is placed in the pinhole. Light having passed through the pinhole is detected by the photodetector 19, the output of which is amplified by an amplifier 28 to obtain a signal corresponding to the light quantity $I_{pin}$. Further, a half-mirror 26 is disposed so that the light beam 14 is divided into two parts. Light reflected from the half-mirror 26 produces a focal point 14'' at the center of an aperture plate 27 having an annular aperture. Light reaching the focal point 14'' and its neighborhood is intercepted by the aperture plate 27, and light directed to a position which is spaced apart, by a predetermined distance, from the optical axis of the light reflected from the half-mirror 26, passes through the annular aperture of the plate 27, to be detected by a photodetector 19'. The inner radius r of the annular aperture is made equal to, for example, a distance between the above optical axis and a position where the light intensity is equal to 1/e of the light intensity on this optical axis (where e is the base of natural logarithm). The output of the photodetector 19' is amplified by an amplifier 28', to obtain a signal corresponding to the light quantity $I_r$. According to the above construction, two signals used in the present invention can be readily obtained by using conventional parts and members. However, the first light detection system has a drawback that it is troublesome to accurately locate the pinhole plate 18 and the aperture plate 27 in relation to the focal points 14' and 14'', respectively.

Figure 10:
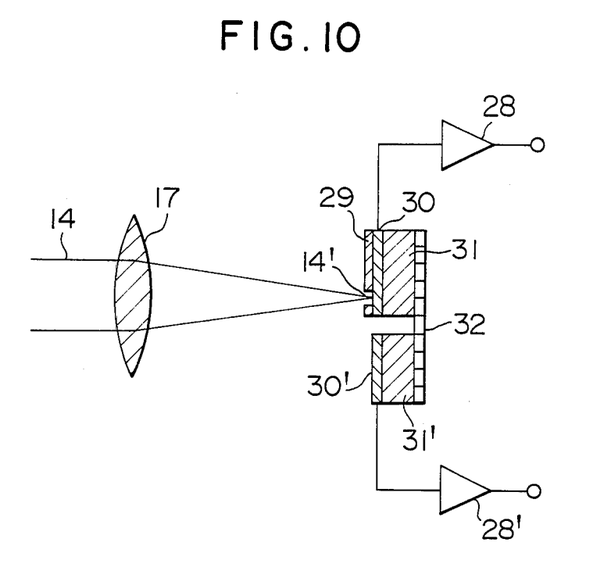
FIG. 10 shows, in section, a single photodetector for detecting central and peripheral portions of a light beam independently of each other.

The second light detection system using a semiconductor photodetector can relieve difficulties in the positioning of members, and can simplify the construction of a boundary surface measuring apparatus. FIG. 10 shows, in section, the second light detection system. Referring to FIG. 10, silicon layers 31 and 31' are formed on a resistive substrate 32, and are mechanically separated from each other so as to be optically and electrically independent of each other. Thin metal films 30 and 30' capable of transmitting light are formed on the silicon layers 31 and 31', respectively. Thus, the so-called Schottky junction is formed between each of the silicon layers 31 and 31' and a corresponding one of the thin metal films 30 and 31'. When light is incident on such a Schottky junction, a photo-current can be derived from the junction on the same principle as in a solar cell. A metal film 29 having a pinhole is formed on the thin film 30 so that only light directed to the focal point 14' reaches the silicon layer 31 through the pinhole and the thin film 30. While, light directed to a position which is spaced apart from the focal point 14', impinges on the silicon layer 31' through the thin film 30'. Thus, a signal corresponding to the light quantity $I_{pin}$ and a signal corresponding to the light quantity $I_r$ are delivered from the amplifier 28 (which is connected to the thin film 30) and the amplifier 28' (which is connected to the thin film 30'), respectively. The light detection system of FIG. 10 is superior to that of FIG. 9, in that only a single photodetector is required to be accurately positioned.

Figure 11:
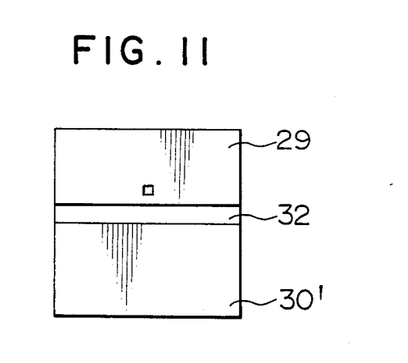
FIG. 11 is a plan view of the photodetector of FIG. 10, viewed from the lens 17 side.

FIG. 11 is a plan view of the semiconductor photodetector shown in FIG. 10. Referring to FIG. 11, the photodetector is divided in a region provided with the metal film 29 for detecting the light passing through the pinhole to detect the quantity of light travelling in the vicinity of the optical axis, and another region having the exposed thin film 30' for detecting the light quantity at a position which deviates from the optical axis. It is to be noted that the shape of the photodetector is not limited to that shown in FIGS. 10 and 11, but the latter region having the form of a circular ring may be provided around the former region having the form of a disc.

As mentioned previously, according to the present invention, all of three drawbacks of the conventional method using the differentiated light quantity can be overcome. Further, as is evident from FIG. 8B, the position $Z_o$ can be determined very accurately.

Although the ratio $I_{pin}/I_r$ has been used in the foregoing explanation, a ratio $I_r/I_{pin}$ may be used in place of the ratio $I_{pin}/I_r$ since a similar effect can be obtained. In this case, however, a curve corresponding to the curve of FIG. 8B falls abruptly at $Z=Z_o$, and hence a threshold value $V_{th}$ is set to a small value.

DESCRIPTION OF THE PREFERRED EMBODIMENTS

Figure 1:
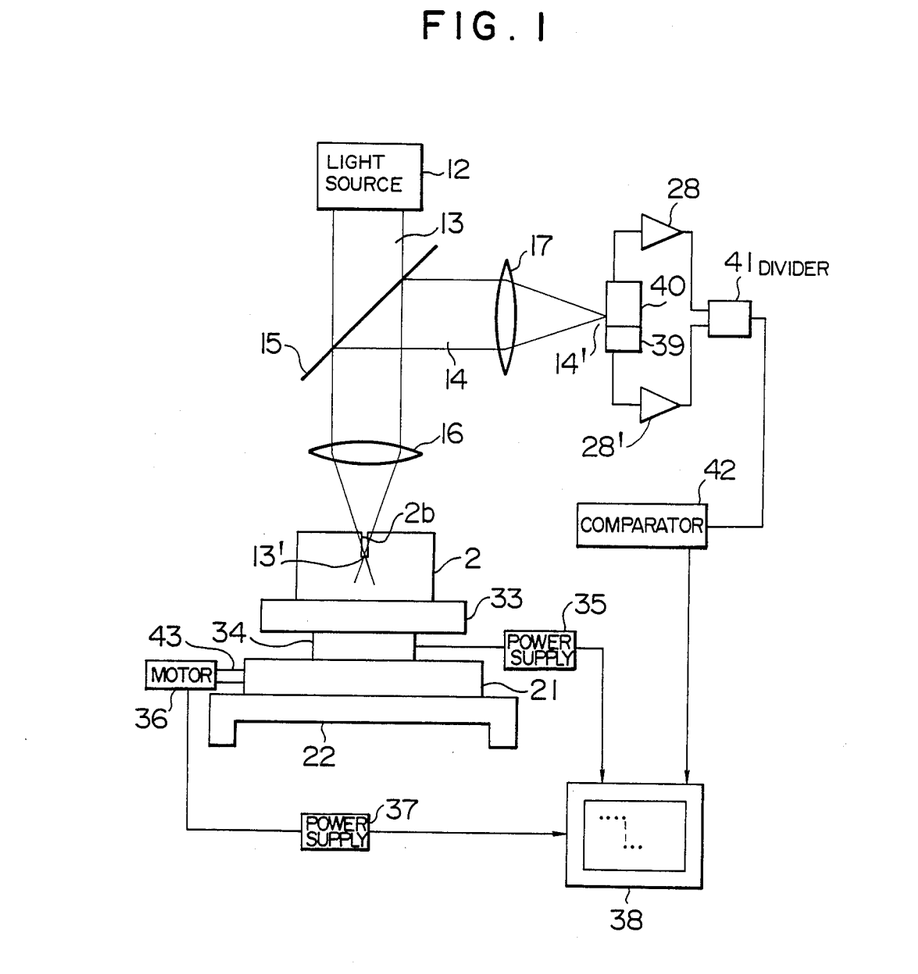
FIG. 1 is a schematic diagram showing the construction of a first embodiment of a boundary surface measuring apparatus according to the present invention.
Figure 2:
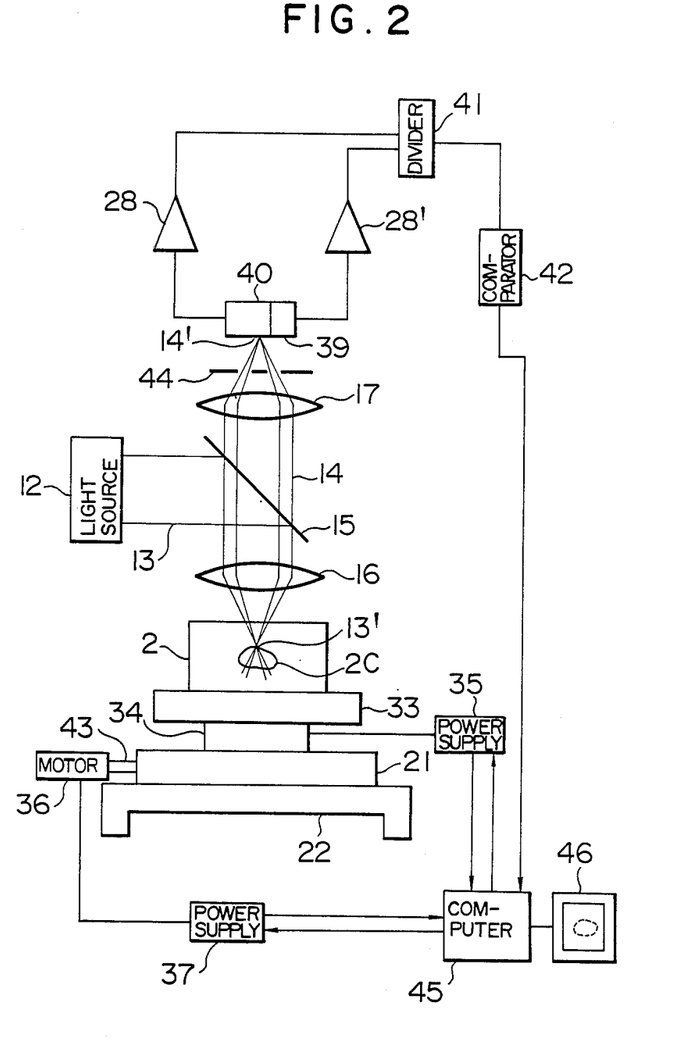
FIG. 2 is a schematic diagram showing the construction of a second embodiment of a boundary surface measuring apparatus according to the present invention.

Now, embodiments of the present invention will be explained below, with reference to the drawings. FIGS. 1 and 2 show first and second embodiments of a boundary surface measuring apparatus according to the present invention, respectively. Referring to FIG. 1, a light source 12 is formed of, for example, a He-Ne laser which emits light having a wavelength of 1.15 $\mu$m. Silicon can transmit this light. A light beam 13 emitted from the light source 12 passes through a half-mirror 15, is focussed by a lens 16, and then impinges on a sample 2 which is made of silicon and has a deep hole 2b. The light source 12 is not limited to the He-Ne laser, but may be formed of a semiconductor laser. It is to be noted that the light beam 13 is focussed on a focal point 13', which is placed just at the bottom of the deep hole 2b. Since the focal point 13' is placed on a boundary surface between air and silicon, the light beam 13 is reflected from the sample 2 at the focal point 13'. The reflected light from the sample 2 passes through the lens 16, and is then reflected from the half-mirror 15 so as to form a light beam 14. The light beam 14 is focussed on a focal point 14' by a lens 17, and then passes through the pinhole of the metal film 29 of FIG. 10, to impinge on a photodetector 40. Although an aperture plate having an annular aperture is not disposed between the lens 17 and photodetectors 39 and 40, the aperture plate may be added to the first embodiment of FIG. 1. The output of the photodetector 40 is amplified by an amplifier 28, and then applied to a divider 41. A peripheral portion of a light spot with its center at the focal point 14' is detected by the photodetector 39. The output of the photodetector 39 is amplified by an amplifier 28', and then applied to the divider 41. The ratio between the outputs of the amplifiers 28 and 28' is calculated by the divider 41, the output of which is sent to a comparator 42. In the comparator 42, the output of the divider 41 is compared with a threshold value which is previously set in the comparator 42. When the output of the divider 41 exceeds the threshold value, the comparator 42 delivers a signal for momentarily dropping the pen of a self-recorder 38. The sample 2 is set on a holder 33, which is detachably mounted on an up-down driver 34 driven by, for example, a piezo-vibrator. The piezo-vibrator can move the driver 34, for example, in a range from 0 to 20 $\mu$m, in a vertical direction. A driving power supply 35 supplies a vibrating voltage to the piezo-vibrator. The vibrating voltage is also applied to the self-recorder 38, to move the pen thereof in a longitudinal direction. The up-down driver 34 is fixed to an X-Y table 21, which is moved in an X- or Y-direction in such a manner that the driving force of a motor 36 operated by an output voltage from another driving power supply 37 is given to the table 21 through a shaft 43. The output voltage from the power supply 37 is also applied to the recorder 38, to move the pen in a transverse direction. The X-Y table 21 is mounted slidably on a nonvibrating base stage 22.

Next, explanation will be made on the operation of the first embodiment in a case where the depth of the deep hole 2b is measured. The deep hole 2b is appropriately located in relation to the focal point 13' by the aid of an optical microscope (not shown) or the like. Then, the movement of the X-Y table 21 is started, and thus the pen of the recorder 38 begins to move in the transverse direction on the basis of the output voltage from the power supply 37. In this state, the power supply 35 is turned on, to drive the up-down driver 34. As a result, the sample 2 moves in relation to the focal point 13' in a vertical direction. When the focal point 13' goes across a boundary surface between silicon and air, the comparator 42 sends the pen dropping signal to the self-recorder 38, and thus the pen of the recorder 38 marks a dot on a recording paper, in the course of the movement in the longitudinal direction. When the longitudinal and transverse axes of the recording paper are previously calibrated, the shape of a cross section of the deep hole 2bcan be known from dots on the recording paper.

As mentioned above, according to the present invention, it is possible to measure the shape of a cross section of a deep hole, which cannot be measured by conventional apparatuses and methods. This is because light capable of passing through a sample is used as shown in FIG. 1, and a ratio between two kinds of light quantities is used which makes it possible to accurately determine a boundary surface even when only a small amount of light is reflected from the sample. In the first embodiment, the light source 12 may be provided with means for changing the wavelength of the light beam 13. In this case, the wavelength of the light beam 13 can be varied in accordance with a to-be-measured sample so that the light beam 13 passes through the sample. It is to be noted that the term "light passing through a sample" includes not only light capable of penetrating the sample but also light capable of entering the sample to a predetermined depth. The latter light can be used for measuring a void within that region of the sample which does not exceed the above depth.

FIG. 2 is a schematic diagram of the second embodiment, and shows a case where the shape of a cross section of a void (namely, an air bubble) 2C which is contained in the sample 2, is measured. In FIG. 2, the same reference numerals as in FIG. 1 designate equivalent or identical parts. Referring to FIG. 2, a small-sized computer 45 processes signals with respect to the void 2C and also performs the centralized control for the whole of the apparatus. That is, the computer 45 interacts with the power supplies 35 and 37, to control the start and end of the movement of each of the up-down driver 34 and X-Y table 21 by the computer 45. The light beam 13 from the laser light source 12 is incident upon the half-mirror 15 from the side, and is reflected from the half-mirror 15 to be directed to the sample 2. Such an optical system is fundamentally the same as that of FIG. 1. The light beam 13 from the half-mirror 15 is focussed on the focal point 13' by the lens 16. The focal point 13' is placed on an upper boundary surface of the void 2C. Light reflected from the upper boundary surface at the focal point 13' passes through the half-mirror 15, to form the light beam 14, which is focussed on the focal point 14' by the lens 17 and then impinges upon the photodetector 40. A peripheral portion of a light spot with its center at the focal point 14' is detected by the photodetector 39. The outputs of the photodetectors 40 and 39 are amplified by the amplifiers 28 and 28', respectively, and then applied to the divider 41, the output of which is applied to the comparator 42. When the focal point 13' passes the boundary surface of the void 2C in the course of the vertical movement of the sample 2, the comparator 42 sends a pulse signal to the computer 45. In addition to the reception of this pulse signal, the computer 45 can know both the displacement of sample in the X- or Y-direction and the displacement of sample in the vertical direction, through the communication with the power supplies 35 and 37. Thus, the computer 45 can three-dimensionally determine the boundary surface of the void 2C. The boundary surface information obtained by the computer 45 is not only stored in an inner memory, but also used for displaying the position of the void 2C on the display screen of a display device 46. In the second embodiment of FIG. 2, in order to clearly discriminate the upper boundary surface of the void 2C from the lower boundary surface thereof, an aperture plate 44 having an annular aperture is disposed in front of the photodetectors 40 and 39. (It is to be noted that the aperture plate 44 is not used in the first embodiment of FIG. 1). The function of the aperture plate 44 will be explained below. Part of light focussed on the focal point 13' is not reflected from the upper boundary surface of the void 2C, but reaches the lower boundary surface thereof. The reflected light from the lower boundary surface is also directed to the photodetectors 40 and 39. As a matter of course, this reflected light is not incident on the focal point 14'. However, in a case where the reflected light from the lower boundary surface is generated in the vicinity of the optical axis, this reflected light may be incident on the focal point 14'. The aperture plate 44 is used for intercepting the reflected light from such a defocussed surface. By using the aperture plate 44, the second embodiment can accurately measure the contour of a void existing within a sample.

In a case where the light source 12 emits light incapable of passing through the sample 2, the second embodiment cannot measure a deep hole having a relative depth of 10 and a void contained in the sample, but can very accurately measure the surface unevenness having a gentle slope for the following reason. In the optical, surface measuring apparatus of FIG. 6A, owing to the noise-level of a signal amplifier, the "window" width cannot be made small, and hence the accuracy of measurement cannot be enhanced. On the other hand, in the second embodiment, a ratio between the light quantity on the optical axis and the light quantity at a position deviating from the optical axis is used for measuring the boundary surface of a sample. Accordingly, the above-mentioned adverse effect of the signal amplifier is eliminated, and thus the unevenness of surface can be measured with accuracies as high as 0.1 $\mu$m.

In the first and second embodiments, explanation has been made on a case where the reflected light from a sample is detected. Alternatively, a ratio between two kinds of light quantities with respect to the transmitted light from the sample may be used, though the signal-to-noise ratio is decreased. A boundary surface measuring apparatus using the transmitted light from the sample is different from the first and second embodiments only in the positional relation between the optical system and the sample, and hence is omitted in the drawings.

According to the present invention, it is possible to measure a boundary surface of a sample very accurately by using light capable of passing through the sample, even when only a small amount of light is reflected from the sample. Accordingly, the shape of the cross section of a deep hole or groove, which cannot be measured by the prior art, is measured with accuracies as high as 0.1 $\mu$m. Further, a void contained in a sample can be readily detected and measured. When a void contains a foreign substance different in refractive index from a medium filling up the void, reflected light from the foreign substance can be detected. Similarly, a foreign particle contained in a sample can be detected on the basis of the reflected light from the foreign particle. Further, even when light incapable of passing through a sample is used, the surface unevenness having a gentle slope can be measured very accurately.

In order to fabricate a semiconductor device having an extremely high integration density, a three-dimensional structure is now being developed. At present, a void contained in a silicon oxide film or silicon nitride film, which is indispensable for the three-dimensional structure, is detected by cutting the film. That is, the void is detected destructively. According to the present invention, such a void can be detected and measured non-destructively in the course of the fabricating process. Also, a deep hole or groove can be non-destructively measured. Accordingly, defects such as a deep hole and a void can be detected early without necessitating a cutting process, and hence the production yield is greatly improved.

A sample of a living being used in the field of biotechnology is usually transparent for visible light. Accordingly, the sample is subjected to an appropriate staining treatment, and then observed by an optical microscope. According to the present invention, as long as the sample of a living being is enclosed with a medium different in refractive index from the sample, the boundary surface between the sample and the medium can be detected and measured without any staining treatment.

As described above, the first and the second embodiments of a boundary surface measuring apparatus according to the present invention have been explained assuming a light detection system similar to that which is shown in FIG. 10. It is a matter of course that another type of a light detection system, such as that shown in FIG. 9, is applicable to the apparatus according to the present invention and could be used in place of that shown in FIG. 10.

We claim:

1. An apparatus for measuring a boundary surface in a depth direction of a body, comprising:
    a body to be measured;
    first light source emitting a first light beam having a wavelength capable of penetrating said to-be-measured body to irradiate said to-be-measured body with said first light beam;
    first focussing means for focussing said first light beam into a small light spot;
    means for moving said to-be-measured body;
    second focussing means for focussing a second light beam from said to-be-measured body;
    light detection means for detecting both the light quantity of a first part of said second light beam which travels in the vicinity of the optical axis of said second beam, and the light quantity of a second part of said second light beam which is directed to a position deviating from said optical axis by a predetermined distance; and
    means for calculating a ratio of one of the light quantity of said first part detected by said light detection means and the light quantity of said second part detected by said light detection means, to the other light quantity as an indication of a position of the boundary surface in the depth direction of said to-be-measured body.

2. A boundary surface measuring apparatus according to claim 1, wherein said second light beam is a reflected light beam from said to-be-measured body.

3. A boundary surface measuring apparatus according to claim 2, wherein said light detection means is a semiconductor photodetector in which a photodetector for detecting the light quantity of said first part of said reflected light beam and another photodetector for detecting the light quantity of said second part of said reflected light beam are united in one body so as to be able to operate independently of each other.

4. A boundary surface measuring apparatus according to claim 3, wherein an aperture plate having an annular aperture is disposed on the optical path of said reflected light beam having been focussed by said second focussing means.

5. A boundary surface measuring apparatus according to claim 3, wherein said first light beam emitted from said light source has an appropriate wavelength so that said to-be-measured body transmits said first light beam.

6. A boundary surface measuring apparatus according to claim 2, wherein an aperture plate having an annular aperture is disposed on an optical path of said reflected light beam having been focussed by said second focussing means.

7. A boundary surface measuring apparatus according to claim 1, wherein said means for moving said to-be-measured body moves said to-be-measured body in a direction in which said first light beam is incident on said to-be-measured body, and moves said to-be-measured body on a plane perpendicular to said incident direction.

8. A boundary surface measuring apparatus according to claim 7, further comprising display means applied with the driving output of said means for moving said to-be-measured body and the output of said means for calculating said ratio, for displaying the shape of a boundary surface of said to-be-measured body.

9. A boundary surface measuring apparatus according to claim 2, wherein said reflected light beam from said to-be-measured body is divided by a beam splitter into two parts, an aperture for transmitting light which travels in the vicinity of the optical axis of said reflected light beam and first light detection means are disposed on the optical path of one of said two parts, an annular aperture and second light detection means are disposed on the optical path of the other part, and a ratio of one of the light quantity detected by said first light detection means and the light quantity detected by said second light detection means to the other light quantity is calculated.

10. A boundary surface measuring apparatus according to claim 1, wherein said first focusing means and said second focusing means form a confocal optical system, and moving means for moving one of said to-be-measured body and said confocal optical system relative to the other of said to-be-measured body and said confocal optical system in a direction in which said first light beam is incident on said to-be-measured body, and said means for calculating a ratio provides an output indicative of said confocal optical system being properly focused at the boundary surface in the depth direction of said to-be-measured body for indicating the position thereof.

11. A method of measuring a boundary surface in a depth direction of a body, comprising the steps of:
    irradiating a body which is to be measured, with a first light beam having a wavelength capable of penetrating said to-be-measured body;
    detecting the light quantity of a first part of a second light beam from said to-be-measured body which travels in the vicinity of the optical axis of said second light beam, and the light quantity of a second part of said second light beam which is directed to a position deviating from said optical axis by a predetermined distance;
    calculating a ratio of one of the light quantity of said first part and the light quantity of said second part to the other light quantity as an indication of the position of the boundary surface in the depth direction of said to-be-measured body;
    measuring the variation of said ratio with the movement of said to-be-measured body; and
    determining the shape of the boundary surface of said to-be-measured body on the basis of the position of said to-be-measured body at a time when said ratio exceeds a predetermined value.

12. A boundary surface measuring method according to claim 11, wherein said second light beam is a reflected light beam from said to-be-measured body.

13. A boundary surface measuring method according to claim 12, wherein said to-be-measured body is moved in a direction in which said first light beam is incident on said to-be-measured body.

14. A boundary surface measuring method according to claim 12, wherein said to-be-measured body is further moved on a plane perpendicular to a direction in which said first light beam is incident on said to-be-measured body.

15. A boundary surface measuring method according to claim 12, wherein the result of measurements with respect to the variation of said ratio with the movement of said to-be-measured body is displayed by display means.

16. A boundary surface measuring method according to claim 15, wherein the result of measurements with respect to the variation of said ratio with the movement of said to-be-measured body is further stored in memory means.

17. A boundary surface measuring method according to claim 11, further comprising the steps of forming a confocal optical system of a first focusing means for focusing said first light beam into a small spot and a second focusing means for focusing said second light beam, and moving one of said to-be-measured body and said confocal optical system relative to the other of said to-be-measured body and said confocal optical system in a direction in which said first light beam is incident on said to-be-measured body, the step of calculating a ratio including providing an output indicative of said confocal optical system being properly focused at the boundary surface in the depth direction of said to-be-measured body for indicating the position thereof.

* * * * *